(12) United States Patent
Ross et al.

(10) Patent No.: US 7,075,738 B2
(45) Date of Patent: Jul. 11, 2006

(54) LINEAR POSITIONING APPARATUS

(75) Inventors: Alan Ross, Albuquerque, NM (US); Edwin D. Tucker, Albuquerque, NM (US)

(73) Assignee: Inlight Solutions, Inc., Albuquerque, NM (US)

( * ) Notice: Subject to any disclaimer, the term of this patent is extended or adjusted under 35 U.S.C. 154(b) by 322 days.

(21) Appl. No.: 10/256,794

(22) Filed: Sep. 27, 2002

(65) Prior Publication Data

US 2004/0061862 A1 Apr. 1, 2004

(51) Int. Cl.
*G02B 7/02* (2006.01)
(52) U.S. Cl. .................................. 359/814
(58) Field of Classification Search ............ 359/814, 359/815; 369/44.15, 44.16
See application file for complete search history.

(56) References Cited

U.S. PATENT DOCUMENTS

| 4,556,316 A | 12/1985 | Doyle ............... 356/452 |
| 4,710,001 A | 12/1987 | Lacey ............... 356/452 |
| 5,486,917 A | 1/1996 | Carangelo et al. ...... 356/452 |
| 5,592,292 A | 1/1997 | Nanko et al. .......... 356/452 |
| 6,813,225 B1 * | 11/2004 | Widdowson et al. ..... 369/44.15 |

OTHER PUBLICATIONS

Reiss, Roger S. "Speed of UV Adhesive Cure is Factor" (Contractor in Ft. Wayne, IN. P.O. Box 15745, Ft. Wayne, IN 46885-5745 USA.
Morcos, Anthony C. "Voice Coil Actuators for Use in Motion Control Systems" Fall 1998 MOTION Magazine.
Quinn, Thomas G. et al "Improved Lightweight Standoff Chemical Agent Detection Sensor" Electro-Optical Technology for Remote Chemical Detection and Identification.

* cited by examiner

*Primary Examiner*—Hwa (Andrew) Lee
(74) *Attorney, Agent, or Firm*—V. Gerald Grafe; Inlight Solutions, Inc.

(57) ABSTRACT

A linear positioning apparatus includes an intermediate portion having an axis, and first and second end portions mounted with flexure legs thereto. The flexure legs accommodate motion of the intermediate portion relative to the end portions along the axis, but inhibit motion of the intermediate portion relative to the end portions in directions not parallel to the axis. The apparatus can accommodate forces having off-axis components, and produce motion that comprises substantially no off-axis component. The apparatus is useful in, for example, optical systems where precise linear motion is required.

20 Claims, 5 Drawing Sheets

LINEAR POSITIONING APPARATUS

TECHNICAL FIELD

The present invention pertains generally to linear positioning, and more specifically to devices that translate applied forces into motion substantially along an axis. The present invention also relates to precision positioning devices useful in optical systems.

BACKGROUND OF THE INVENTION

Linear actuators are utilized for tasks where a linear movement or application of a force is desired. Generally, a linear actuator translates a first element linearly with respect to a second element. Often the second element is fixed with respect to a frame of reference. Linear actuators are utilized in a wide-variety of applications, such as assembly-line processes in which precise linear displacements and reciprocating motions must be generated and maintained. Linear actuators are also utilized in numerous optical systems, such as auto-focus cameras with positioning lenses and laboratory analysis devices, such as interferometers.

An interferometer is an instrument that provides a means of spectral discrimination by way of a precision splitting and recombination of a beam of light. The interferometer achieves this discrimination by varying the pathlength in one half of the beam with respect to the other, and using the resulting interference of the two beams to derive the intensity distribution of wavelengths within the beam.

The mechanism used to vary the pathlength of the variable path portion of the beam must provide repeatable and linear motion in order to preserve the phase and spatial relationship between the two beams as a function of time. The better this mechanism performs, (i.e. the straighter and smoother the motion of the moving mirror), the better the resulting information that can be obtained from the instrument. Thus, an improvement to the efficiency and expense of an interferometer's linear positioning system would be a welcome advance.

Improved linear actuators are advantageous other systems as well, including generally the adjustment, calibration, pointing, focusing and the like, of various technical or scientific instruments including spectrometers and telescopes.

The majority of motion-positioning mechanisms utilized in conventional linear actuators are configured from one of three technologies: ball bearings, roller bearings and dovetails. Such technologies provide advantages such as high load capability, and long travel. They all, however, provide varying degrees of friction and stiction, which are undesirable in systems and devices where precise movement over very short distances is required. The use of ball bearings, roller bearings and/or dovetails, for example, can cause wobble, hysteresis, backlash, and an uncertainty in reproducibility, which can all limit their practical usefulness.

Flexures have also been utilized to implement linear actuators. For examples, flexures have been utilized with auto-focus cameras for the positioning of associated lenses. In general, a flexure is a frictionless, stictionless component that relies upon the elastic deformation (i.e., flexing) of a solid material. Sliding and rolling can thus be eliminated from the design of flexure-based linear actuators. A flexure component or mechanism is generally limited to applications where the required travel is typically no more than 10–15% of the major dimension of the device or system in question. In addition to a lack of internal friction, flexure devices also provide a high stiffness, a high load capacity, and a high resistance to shock. Flexures also exhibit a low sensitivity to vibration. Therefore, because of the frictionless, stictionless nature of a flexure-based positioner, a high degree of vibration can be tolerated. Also, because of the stiffness of a flexure design maintaining a specific position can be greatly enhanced.

The present inventors thus recognize, based on the foregoing, that a need exists for an improved linear actuator for use in devices requiring the precise movement of components and objects. The present inventors have concluded that improvements over conventional and traditional linear actuator devices and methodologies can be achieved through the implementation of an improved flexure-based apparatus and methodologies thereof, as will be further disclosed herein.

BRIEF SUMMARY OF THE INVENTION

The following summary of the invention is provided to facilitate an understanding of some of the innovative features unique to the present invention, and is not intended to be a full description. A full appreciation of the various aspects of the invention can be gained by taking the entire specification, claims, and drawings as a whole.

A linear positioning apparatus according to the present invention can include an intermediate portion and two end portions. The end portions mount with the intermediate portions with flexure legs, where a flexure leg is configured so that motion of the intermediate portion relative to the end portions along an axis is facilitated while motion not parallel to the axis is inhibited. For example, a flexure leg can mount with an end portion at a first attachment point and with the intermediate portion at a second attachment point. The first and second attachment points can be located such that a line drawn between them is not parallel to the axis. Motion along the axis can thereby be accommodated by flexure of the flexure leg. The resistance of the flexure leg, or of a combination of flexure legs, to flexure along directions not parallel to the axis can be greater than the resistance to flexure parallel to the axis, inhibiting off-axis relative motion.

Each end portion can mount with the intermediate portion with a plurality of flexure legs, providing greater resistance to off-axis motion. Three flexure legs can provide a balance of complexity and performance for some applications. Also, each flexure leg can have a stiffness parallel to the axis that is less than its stiffness in direction non-parallel to the axis, for example, by having a thicker cross-section normal to the axis than parallel to the axis. Specific regions of a flexure leg, for example regions near the attachment points, can have an even further reduced stiffness (e.g., thickness parallel to the axis) to further ease on-axis relative motion.

In some embodiments, the end portions and intermediate portion can be coaxial. In some embodiments, the end portion and intermediate portions have circular cross-sections normal to the axis. Many different combinations of materials and dimensions can be used in accordance with the present invention. Travel distance required, limitations on input force available/desirable, off-axis stiffness required, overall size/space requirements, the weight of the moving load and ease of fabrication can influence the design choices. The context of a given application can determine the specific design choices, and even then there will be trade-offs between variables. Aluminum can be suitable for applications with small required travel due to its machinability and relatively low cost, but might not be ideal if larger deformations are required due to its poorer long-term fatigue resistance under larger stresses. Steel and more exotic metal alloys can be used to enhance fatigue resistance and achieve longer travels but might require higher motive forces due to their higher modulus of elasticity and might be more expensive to machine. A molded plastic part can also be used, and might be substantially less expensive, though it would might suffer from poorer off-axis stiffness and fatigue characteristics. The dimensions can be chosen to accommodate the intended application, such as requirements of optical components, required travel and frequency of reciprocation.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate embodiments of the present invention and are not intended to limit the scope of the invention.

Figure 1:
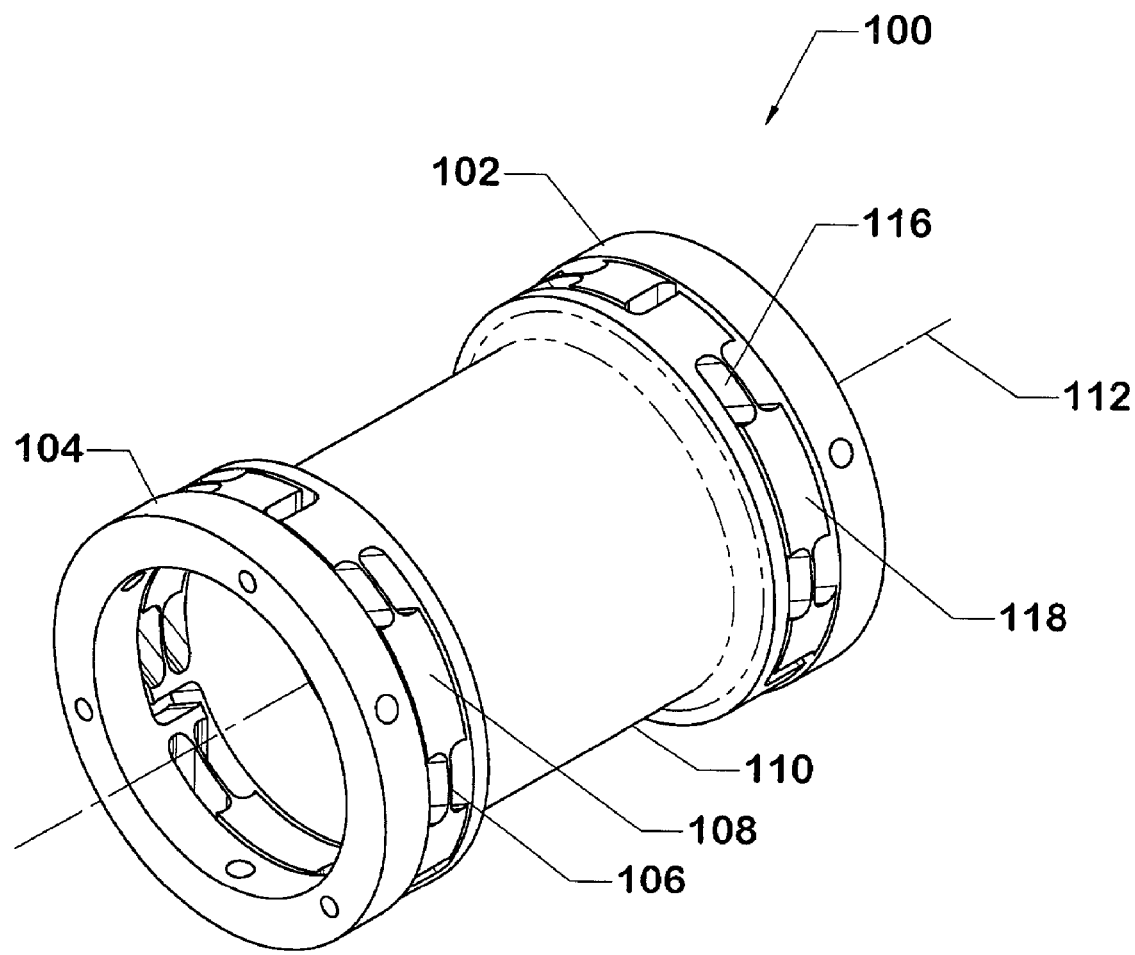
FIG. 1 is a perspective view of a linear positioning apparatus, which can be implemented in accordance with the present invention.

FIG. 1 is a perspective view of a linear positioning apparatus 100 in accordance with the present invention. Linear positioning apparatus 100 can be configured with a positioning element having material and dimensional properties such that when a force is applied at an axis 112 of linear positioning apparatus 100, it deforms in a manner that mechanically translates an object attached thereto in a straight path for a distance responsive to the applied force.

Linear positioning apparatus 100 is shown generally cylindrical in shape and includes a plurality of flexure legs mounted with end portions 102 and 104. An intermediate portion 110 mounts with the flexure legs and thereby with end sections 102 and 104. For example, end section 104 mounts with one or more flexure legs 108 (three are shown in the figure) spaced substantially symmetrically about the axis. Likewise, end section 102 mounts with one or more flexure legs 118 (three are shown in the figure) spaced substantially symmetrically about the axis. Flexure legs 108, 118 can have a greater thickness measured perpendicular to the axis than their thickness measured parallel to the axis, providing reduced stiffness parallel to the axis and consequently allowing low resistance to motion parallel to the axis. Also, flexure legs 108, 118 can have reduced thickness parallel to the axis in selected regions 106, 116, allowing even lower resistance to motion parallel to the axis.

By arranging flexure legs 108 and 118 in this manner, the force required to translate center section 110 with respect to end sections 104 and 102 along the axis is low relative to the force required to translate center section 110 in any other direction with respect to end sections 104 and 102. In this manner, a single mechanical element (i.e., center section 110) tends to travel in a straight path parallel to the axis 112 of the linear positioning apparatus 100 even when subjected to forces that are not parallel to the axis.

Note the symmetry of the flexure-based element (e.g., center section 110 of FIG. 1) about its mid-plane. In the illustrative example described herein with respect to FIG. 1, the mid-plane of the flexure element coincides with the plane of symmetry in the device or unit (e.g., a spectrometer, interferometer, etc.) of which it is a part. This symmetry can enhance the resistance of the overall system to deformation under thermal loads because variations in the dimensions of the element due to thermal expansion tend to balance about the plane of symmetry, thereby minimizing misalignments of other elements in that plane.

Figure 2:
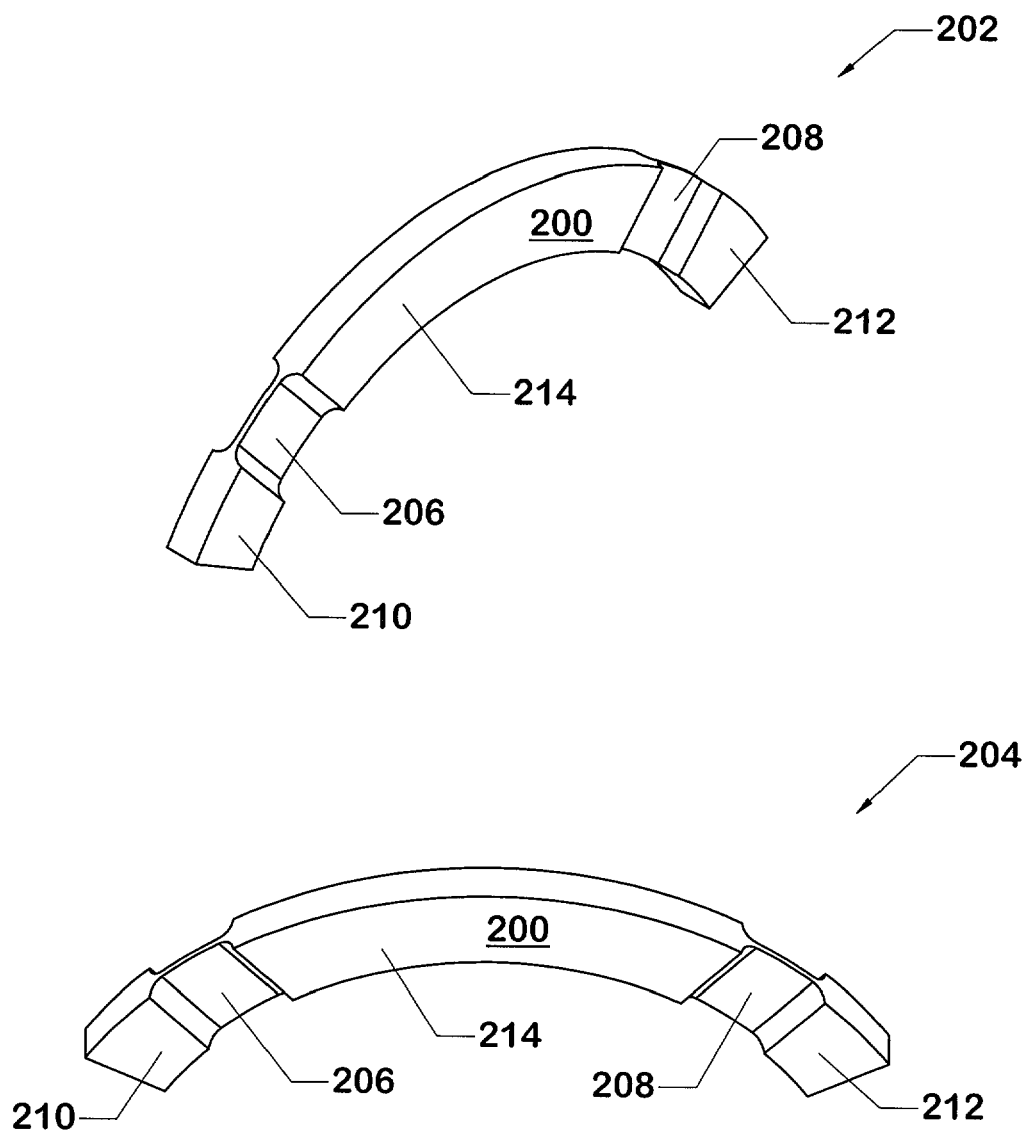
FIG. 2 is two perspective views of a flexure web, which can be implemented in accordance with the present invention.

FIG. 2 illustrates two perspective views of specific embodiments of a flexure leg 200 according to the present invention. FIG. 2 depicts both an angular perspective view 202 and a side perspective view 204 of flexure leg 200. Flexure 200 includes a mid portion 214 and two end portions 210 and 212. A flex portion 206 is shown located between mid potion 214 and end portion 210, while a flex portion 208 is configured between mid portion 214 and end portion 212. In use, end portions 212, 210 of flexure leg 200 would mount with an end portion and the intermediate portion of the apparatus such that the thicker cross-sectional dimension was substantially normal to the axis of the apparatus. The thicker cross-section, and concordant greater stiffness, would consequently oppose a component of motion of the intermediate portion relative to the end portions that is normal to the axis. In contrast, the thinner cross-section, further reduced by the flex portions 206, 208, and concordant reduced stiffness, would accommodate a component of motion parallel to the axis of the apparatus.

Figure 3:
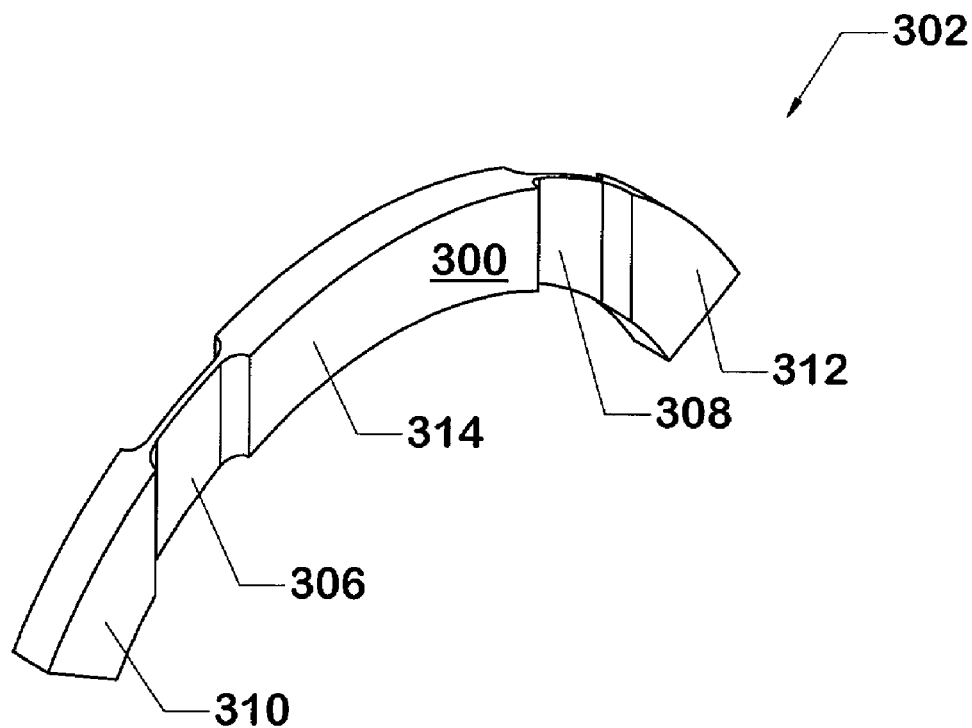
FIG. 3 depicts two perspective views of another flexure web, which can be implemented in accordance with the present invention.
Figure 3:
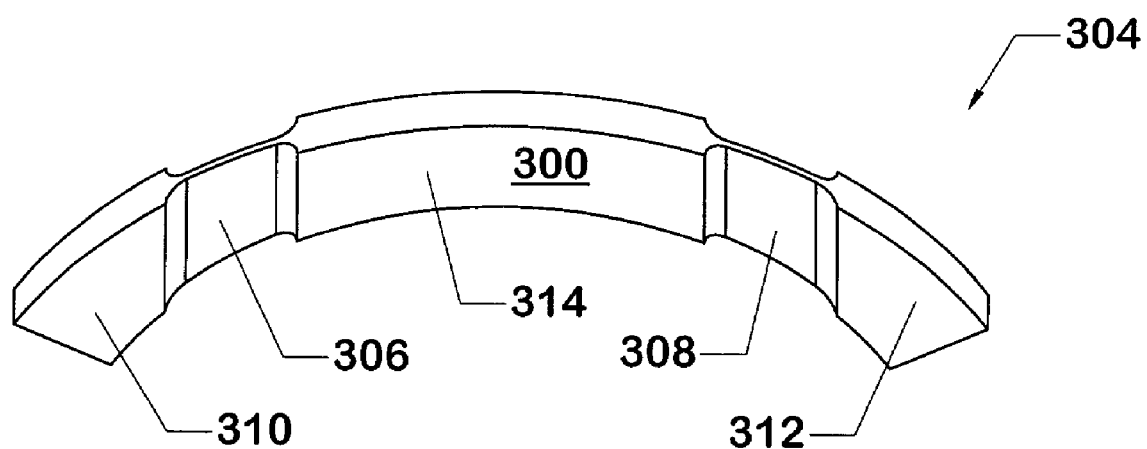

FIG. 3 illustrates two perspective views of specific embodiments of a flexure leg 300 according to the present invention. FIG. 3 depicts both an angular perspective view 302 and a side perspective view 304 of flexure leg 300. Flexure 300 includes a mid portion 314 and two end portions 310 and 312. A flex portion 306 is shown located between mid potion 314 and end portion 310, while a flex portion 308 is configured between mid portion 314 and end portion 312. In use, end portions 312, 310 of flexure leg 300 would mount with an end portion and the intermediate portion of the apparatus such that the thicker cross-sectional dimension was substantially normal to the axis of the apparatus. The thicker cross-section, and concordant greater stiffness, would consequently oppose a component of motion of the intermediate portion relative to the end portions that is normal to the axis. In contrast, the thinner cross-section, further reduced by the flex portions 306, 308, and concordant reduced stiffness, would accommodate a component of motion parallel to the axis of the apparatus. In contrast to the flexure leg in FIG. 2, where the reduced cross-sections in the flex portions were oriented substantially radially outward from the apparatus axis, in FIG. 3 the reduced cross-sections in the flex portions are oriented substantially parallel to each other approximately centered on the apparatus axis. Such parallel orientation can ease the fabrication of the apparatus, for example by allowing a single machining orientation for both flex portions. It can also provide different flexure leg stiffness characteristics, and accordingly different apparatus performance characteristics.

An apparatus according to the present invention can be made by fabricating the various portions separately, and then attaching them appropriately. Alternatively, an apparatus can be made by machining a solid piece, removing material to form the flexure legs which separate the intermediate portion from the end portions. Combinations of these two methods can also be used, for example by forming the intermediate portion and flexure legs from a single piece, then attaching separately-formed end portions. The various portions can be made from a wide range of materials and with a wide range of dimensions, depending on, for example, the desired cost, fabrication time, stiffness properties, durability, thermal response, resistance to off-axis motion, resistance to on-axis motion, etc.

Figure 4:
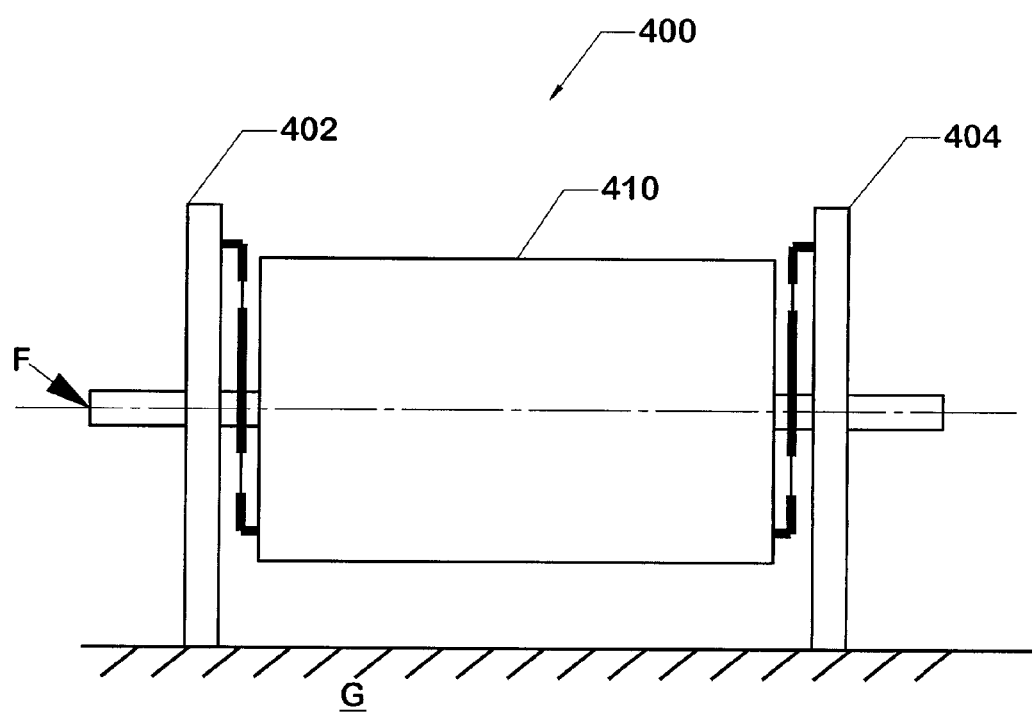
FIG. 4 is a high-level flow chart of operations depicting logical operational steps, which can be followed to configure a linear positioning apparatus, in accordance with the present invention.
Figure 5:
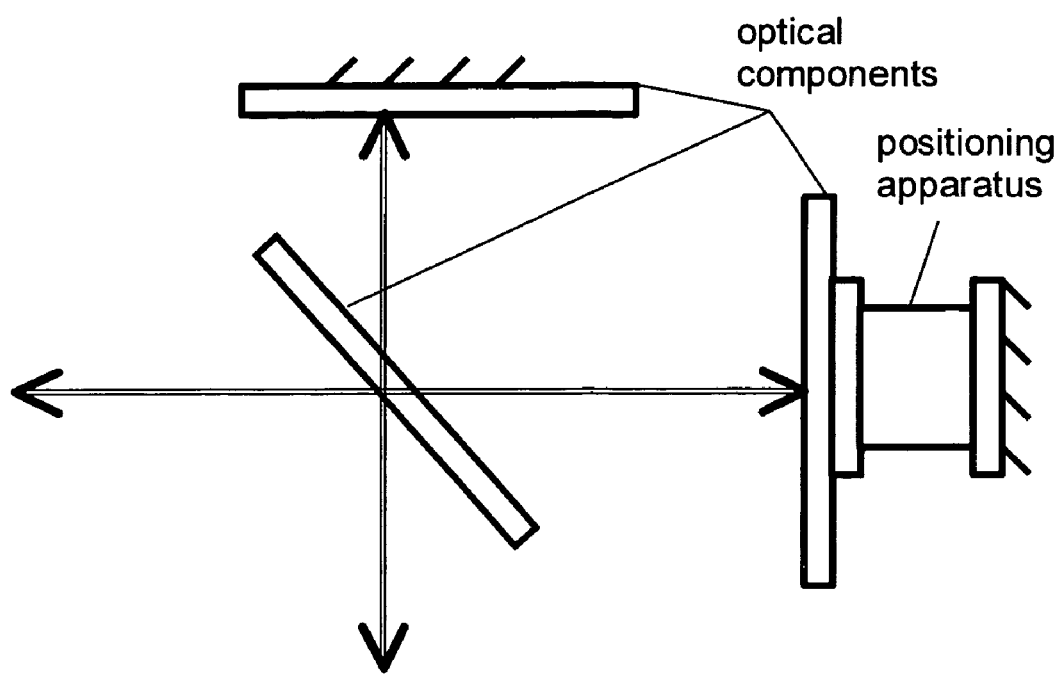
FIG. 5 is a schematic depiction of an interferometer according to the present invention.

A positioning apparatus according to the present invention can be configured to translate applied force to translation substantially along the apparatus's axis. FIG. 4 is a schematic of such a system. An intermediate portion 410 mounts with flexure legs to two end portions 402, 404. End portions 402, 404 are fixedly mounted to a reference, in the figure depicted as ground G. A force F can be applied to intermediate portion 410; the force can comprise on-axis and off-axis components. The flexure legs flex in response to force F, allowing motion of intermediate portion 410 along the axis. The flexure legs' resistance to flexure normal to the axis, however, inhibits motion of intermediate portion 410 in any other direction. The roles of the end portions and intermediate portions can be exchanged: fixing the intermediate portion to a reference, mechanically connecting the end portions, and applying a force to the end portions.

The present invention can be utilized in association with numerous applications where straight-line travel over short distance is generally required, including those applications where long-term stability and repeatability demands are stringent. Non-optical applications of the present invention include micro-positioning of components during assembly of miniature instrumentation or anywhere that small linear displacements or reciprocating motions must be generated and maintained. The manufacture of discrete components in sophisticated fabrication facilities utilizing robotic arms and their associated movement, for example, can be enhanced by application of the present invention to various actuating elements thereof.

Optical applications of the present invention can include non-contact surface analysis, where a stylus or sensor must be maintained at a fixed small distance from a sample, microscope sample micro positioning or steering mirrors in auto-alignment systems. For example, the invention disclosed herein can be utilized for positioning the moving mirror of a spectrometer. One or more flexure elements thereof can be machined of, for example, aluminum and then mounted within a housing that fixes the end sections (e.g., end sections 104 and 102 of FIG. 1) and allow deformation (i.e., flexure) of a center section (e.g., center section 110) on-axis by means of a voice coil actuator. A cube-corner retroreflector or another reflecting device can be mounted at a center section and scanned over a travel time of, for example ±0.15 mm in a reciprocating motion at a rate of approximately 2 Hz. The straight-line travel requirements of a spectrometer can be quite demanding (i.e., on the order of 1 micron tolerances), thus the invention described herein can provide adequate stability to allow for effective, stable scanning during operation of the entire spectrometer system.

The present invention can also be utilized in association with many near-infrared spectroscopy and multi-variate analysis devices and systems thereof.

Many different combinations of materials and dimensions can be used in accordance with the present invention. Travel distance required, limitations on input force available/desirable, off-axis stiffness required, overall size/space requirements, the weight of the moving load and ease of fabrication can influence the design choices. The context of a given application can determine the specific design choices, and even then there will be trade-offs between variables. Aluminum can be suitable for applications with small required travel due to its machinability and relatively low cost, but might not be ideal if larger deformations are required due to its poorer long-term fatigue resistance under larger stresses. Steel, other metals, and metal alloys can be used to enhance fatigue resistance and achieve longer travels but might require higher motive forces due to their higher modulus of elasticity and might be more expensive to machine. A molded plastic part can also be used, and might be substantially less expensive, though it might suffer from poorer off-axis stiffness and fatigue characteristics. The dimensions can be chosen to accommodate the intended application, such as requirements of optical components, required travel and frequency of reciprocation.

The embodiments and examples set forth herein are presented to explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

We claim:

1. A positioning apparatus comprising:
   a. An intermediate portion defining an axis;
   b. A first end portion, mounted with the intermediate portion with a first flexure leg, wherein the first flexure leg mounts with the first end portion at a first attachment location and with the intermediate portion at a second attachment location, where a line connecting the first and second attachment locations is not line parallel to the axis;
   c. A second end portion, mounted with the intermediate portion with a second flexure leg, wherein the second flexure leg mounts with the second end portion at a third attachment location and with the intermediate portion at a fourth attachment location, where a line connecting the third and fourth attachment locations is not line parallel to the axis;
   wherein each flexure leg comprises three portions: a mid portion between the attachment points, and two flex portions, each situated between the mid portion and one attachment location, and wherein the stiffness parallel to the axis of the flex portions is less than that of the mid portion.

2. An apparatus as in claim 1, wherein the first end portion mounts with the intermediate portion with a plurality of first flexure legs.

3. An apparatus as in claim 2, wherein the plurality of first flexure legs are spaced substantially symmetrically about the axis.

4. An apparatus as in claim 2, wherein the first end portion mounts with the intermediate portion with three first flexure legs.

5. An apparatus as in claim 2, wherein the second end portion mounts with the intermediate portion with a plurality of second flexure legs.

6. An apparatus as in claim 5, wherein the plurality of second flexure legs are spaced substantially symmetrically about the axis.

7. An apparatus as in claim 5, wherein the second end portion mounts with the intermediate portion with three second flexure legs.

8. An apparatus as in claim 1, wherein the thickness of the flexure leg parallel to the axis is less in the flex portion than in the mid portion.

9. An apparatus as in claim 1, wherein the intermediate portion, the first and second end portions, and the flexure legs are separate pieces fastened together.

10. An apparatus as in claim 1, wherein the intermediate portion, the first and second end portions, and the flexure legs are formed from a single piece.

11. An apparatus as in claim 1, wherein the intermediate portion has a substantially circular cross-section in a plane normal to the axis.

12. An apparatus as in claim 1, wherein the first end portion has a substantially circular cross-section in a plane normal to the axis.

13. An apparatus as in claim 12, wherein the second end portion has a substantially circular cross-section in a plane normal to the axis.

14. An interferometer, comprising:
   a. Optical components establishing a first path length through the interferometer and a second path length through the interferometer, wherein the second path length is adjustable by motion of a first optical component relative to a second optical component; and
   b. A positioning apparatus according to claim 1 mounted with the first and second optical components providing linear relative motion thereof.

15. A positioning apparatus comprising:
   a. An intermediate portion defining an axis;
   b. A first end portion, mounted with the intermediate portion with a first flexure leg, wherein the first flexure leg mounts with the first end portion at a first attachment location and with the intermediate portion at a second attachment location, where a line connecting the first and second attachment locations is not parallel to the axis;
   c. A second end portion, mounted with the intermediate portion with a second flexure leg, wherein the second flexure leg mounts with the second end portion at a third attachment location and with the intermediate portion at a fourth attachment location, where a line connecting the third and fourth attachment locations is not parallel to the axis;
   d. wherein the first flexure leg mounts such that the first and second attachment locations are at substantially the same radial distance from the axis and such that a radius from the axis to the first attachment location forms a nonzero angle with a radius drawn from the axis to the second attachment location, and wherein the second flexure leg mounts such that the third and fourth attachment locations are at substantially the same radial distance from the axis and such that a radius from the axis to the third attachment location forms a nonzero angle with a radius drawn from the axis to the fourth attachment location.

16. An apparatus as in claim 15, wherein the first end portion mounts with the intermediate portion with three flexure legs.

17. An apparatus as in claim 16, wherein the second end portion mounts with the intermediate portion with three flexure legs.

18. A method of translating an applied force into substantially linear motion, comprising:
   a. Providing a positioning apparatus, said positioning apparatus comprising:
      i. An intermediate portion defining an axis;
      ii. A first end portion, mounted with the intermediate portion with a first flexure leg, wherein the first flexure leg mounts with the first end portion at a first attachment location and with the intermediate portion at a second attachment location, where a line connecting the first and second attachment locations is not parallel to the axis;
      iii. A second end portion, mounted with the intermediate portion with a second flexure leg, wherein the second flexure leg mounts with the second end portion at a third attachment location and with the intermediate portion at a fourth attachment location, where a line connecting the third and fourth attachment locations is not parallel to the axis;
   b. Fixing the first and second end portions such that motion of the first and second end portions parallel to the axis is inhibited;
   c. Coupling the applied force to the intermediate section, resulting in motion thereof substantially along the axis.

19. A method as in claim 18, wherein the positioning apparatus comprises a plurality of first flexure legs, and a plurality of second flexure legs.

20. A method as in claim 19, wherein the positioning apparatus comprises three first flexure legs spaced substantially symmetrically about the axis, and three second flexure legs spaced substantially symmetrically about the axis.

* * * * *